(12) United States Patent
Brandt et al.

(10) Patent No.: US 8,004,978 B2
(45) Date of Patent: Aug. 23, 2011

(54) METHOD FOR RESERVING BANDWIDTH

(75) Inventors: Thomas Brandt, Neumünster (DE); Stefan Honold, München (DE); Markus Messner, Biedermannsdorf (AT); Maria Schwarz, Vienna (AT); Gerd Dieter Spahl, Puchheim (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 159 days.

(21) Appl. No.: 11/991,998

(22) PCT Filed: Aug. 24, 2006

(86) PCT No.: PCT/EP2006/065651
§ 371 (c)(1),
(2), (4) Date: Dec. 3, 2009

(87) PCT Pub. No.: WO2007/031392
PCT Pub. Date: Mar. 22, 2007

(65) Prior Publication Data
US 2010/0067541 A1  Mar. 18, 2010

(30) Foreign Application Priority Data
Sep. 16, 2005  (DE) .......................... 10 2005 044 387

(51) Int. Cl.
*H04J 1/16* (2006.01)
(52) U.S. Cl. ........................................ 370/230; 709/226
(58) Field of Classification Search .................. 370/352, 370/353, 395.2–395.41, 229, 230; 709/223–229
See application file for complete search history.

(56) References Cited

U.S. PATENT DOCUMENTS

| 6,760,774 B1 | 7/2004 | Soumiya et al. |
| 2002/0103924 A1* | 8/2002 | Nomura ........................ 709/235 |
| 2003/0147352 A1 | 8/2003 | Ishibashi et al. |
| 2006/0159125 A1* | 7/2006 | Barzegar et al. .............. 370/468 |

FOREIGN PATENT DOCUMENTS
EP  1211851 A1  6/2002

OTHER PUBLICATIONS

Lixia Zhang et al: "RSVP: A New Resource ReSerVation Protocol", IEEE Network, IEEE Service Center, New York, NY, US. vol. 7, No. 5, (Sep. 1993), pp. 8-18, XP000828446, ISSN: 0890-8044.
De-Nian Yang et al: "MQ: An Integrated Mechanism for Multimedia Multicasting", IEEE Transactions on Multimedia, IEEE Service Center, Piscataway, NJ, US, vol. 3, No. 1, Mar. 2001, pp. 82-97, XP011036240, ISSN: 1520-9210.

* cited by examiner

*Primary Examiner* — Ricky Ngo
*Assistant Examiner* — Kan Yuen

(57) ABSTRACT

Method for reserving bandwidth in a packet-oriented network, in which a packet-oriented communication link is set up between a plurality of network elements using at least one communication path. In this case, an identification number which is unique to the communication link and is intended to identify the communication paths associated with the communication link is allocated. A bandwidth value for a respective communication path is then determined as the maximum bandwidth required by network elements in this communication path, and bandwidth in the respective communication path is reserved using the bandwidth value.

20 Claims, 2 Drawing Sheets

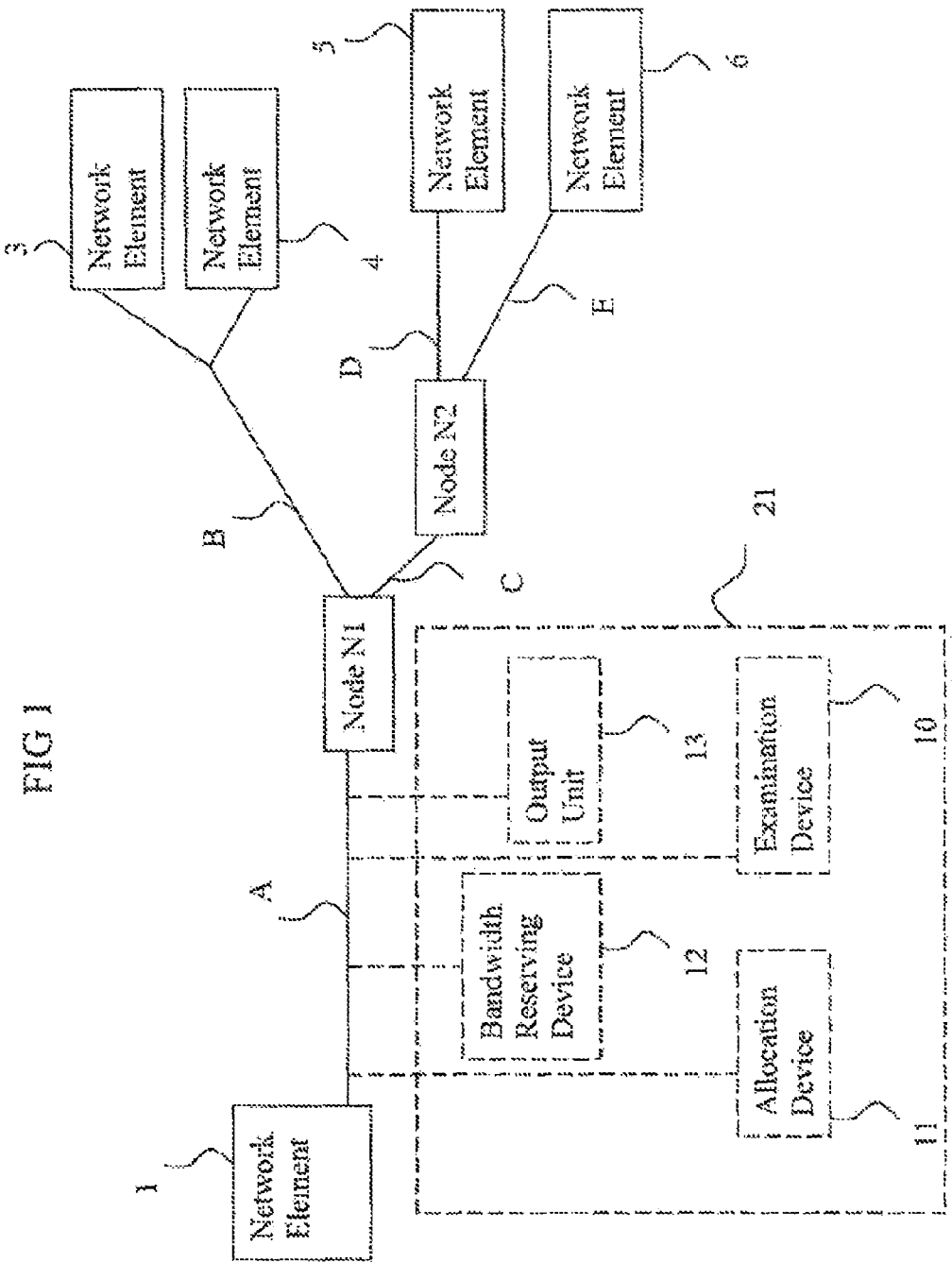

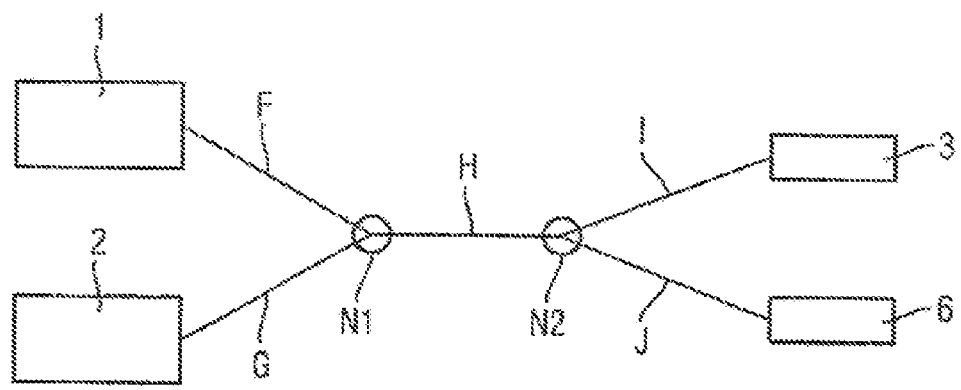

METHOD FOR RESERVING BANDWIDTH

CROSS REFERENCE TO RELATED APPLICATIONS

This application is the US National Stage of International Application No. PCT/EP2006/065651, filed Aug. 24, 2006 and claims the benefit thereof. The International Application claims the benefits of German application No. 10 2005 044 387.7 filed Sep. 16, 2005, both of the applications are incorporated by reference herein in their entirety.

FIELD OF INVENTION

The invention concerns a method and an arrangement for reserving bandwidth in a packet-oriented network.

BACKGROUND OF THE INVENTION

Planning and allocation of bandwidth is known in packet-oriented networks. The term bandwidth is understood to mean an expected or actual value of a volume of data exchanged per time unit between network elements.

In packet-oriented networks, frequent use is made of bandwidth reservation between two or more network elements. Such bandwidth reservation is implemented, for example, for an enhanced priority data exchange, or for a data exchange that provides for a real-time or quasi real-time transmission. The latter transmission is employed in particular for communication using an RTP (real-time protocol), for a VoIP (voice over Internet protocol) communication connection, for example.

In the case where a logical call setup is initially directed to several alternate destination network elements, subsequent to a successful call setup with one of the destination network elements, in order to then maintain a single connection to this network element, a conventional bandwidth reservation proves to be inefficient in this respect, since a reservation is initially made for all alternate destination network elements. As a result, transmission capacities are unnecessarily committed for a considerable period of time. Similarly, a call setup from one of several alternate source network elements, from which a single call is sent out following a successful call set-up with one of the source network elements, proves to be just as inefficient.

SUMMARY OF INVENTION

The object of the invention is to state an improved method for bandwidth reservation in a logical connection of network elements in a packet-oriented network.

Regarding its method, one solution to the problem is achieved by a method having the features of the claims and regarding its device, by an arrangement having the features of the claims.

The method according to the invention for reserving bandwidth in a packet-oriented network, in which a packet-oriented communications link is established between a plurality of network elements via at least one communication path, provides in a first step for an allocation of an identification number that is unique to the communication link, to identify the communication paths associated with the communication link. Furthermore, provision is made for determining a bandwidth value for a respective communication path, in which the bandwidth value results in a maximum number of bandwidth requests requested by network elements in this communication path. Finally, a reservation of a bandwidth in the respective communication path is made by means of the calculated bandwidth value.

The method according to the invention is based on the idea of replacing individual bandwidth reservations by a section-by-section or communication path-wise reservation, with the objective of reserving in the individual communication paths a bandwidth for the actual connection which ultimately materializes from several alternate call setup attempts.

Instead of a known allocation of a respective identification number for a respective call set-up, the solution according to the invention is based on an allocation of an identification number that is unique to all call set-ups associated with the communication link. A bandwidth management system evaluating this identification number is thus able to prevent multiple reservation in individual communication paths.

In this case the communication path is an assumed logical connection between two network elements or between a network element and a network node in the packet-oriented network that is otherwise considered to be connectionless.

On each communication path along the communication link to be set up the bandwidth management system checks whether bandwidth reservations with a given identification number are already present. If an identification number to be examined coincides with a given identification number, no new bandwidth reservation is made; instead, an existing bandwidth reservation is confirmed or corrected to a higher bandwidth requirement.

Thus, if for a communication link to be set up several call set-ups are running over a common communication path, instead of a previously known individual reservation, the highest value or maximum requested bandwidth of the individual call setups is determined and the requested bandwidth with this highest value is set in this communication path.

An important advantage of the method according to the invention is to be seen in the fact that its use enables more effective network management with lower consumption of network resources.

Advantageous developments of the invention are cited in the subclaims.

BRIEF DESCRIPTION OF THE DRAWINGS

An exemplary embodiment with further advantages and embodiments of the invention is explained in further detail below with the aid of the drawing, in which:

FIG. 1: shows a block diagram for the schematic representation of the establishment of a communication link with a plurality of called network elements, FIG. 2: shows a block diagram for the schematic representation of the establishment of a communication link with a plurality of calling and called network elements.

DETAILED DESCRIPTION OF INVENTION

FIG. 1 shows a section of a packet-oriented network. The component parts of this packet-oriented network are a first network element 1, a third network element 3, a fourth network element 4, a fifth network element 5, a sixth network element 6, a first node element N1 and a second node element N2.

Some of the above-mentioned functional units are interconnected by communication paths A, B, C, D, E. These communication paths A, B, C, D, E are to be allocated to a communication link to be established, starting from first calling network element 1. Initially in this case, a "calling" network element is generally understood to be a network element initiating a communication link. In an exemplary embodiment of the invention to be explained later—with the use of packet-oriented communication terminals or VoIP terminals—in accordance with telecommunications terminology the calling network element is to be considered as the source of a real-time communication to be established, such as a voice, video connection, etc., for example.

A first communication path A is located between the calling network element 1 and the first node element N1. A second communication path B is located between the first node element N1 and the third or fourth network element 3, 4. A third communication path C is located between the first and the second node element N1, N2. A fourth communication path D is located between the second node element N2 and the fifth network element 5. A fifth communication path E is located between the second node element N2 and the sixth network element 6.

The above-mentioned communication paths are to be considered as "logic" connections, that is to say above a logical connection layer of a network protocol stack. The connection paths A, B, C, D, E belong to one and the same communication link which starts from the calling network element 1 and therefore all carry the same identification number.

A situation in which a calling network element initially calls several network elements, 3, 4, 5, 6 as the destination and with a successful call set-up communicates exclusively from this moment on with one of the network elements 3, 4, 5, 6, is a so-called "multiaddress call", for example. In the above-mentioned performance feature a calling VoIP communication terminal 1 calls a call pickup group consisting of terminals 3, 4, 5, 6. On receipt of the call at one of the terminals 3, 4, 5, 6, the communication link between this terminal and the calling terminal 1 is established, while each of the remaining communication paths A, B, C, D, E are again free.

In the above-mentioned exemplary embodiment of the network elements 1, 3, 4, 5, 6, as VoIP communication terminals 1, 3, 4, 5, 6, the node elements N1, N2 take on the function of a communication system, for example. In this case the communication system can have conventional TDM (time division multiplex) switching technology with an interface to the packet-oriented network via gateways, and in relation to switching can operate in true packet-oriented mode (for example using the SIP protocol (session initiation protocol) or also exist as a hybrid of the latter embodiments. Such a hybrid-type is also often described as a "convergent" communication system.

In the case of an outgoing call by the terminal 1—controlled by the communication system N1—the first communication system N1 initiates a bandwidth reservation request for the depicted communication paths A, B, C, D, E, which, in addition to an identification number, contains a statement of the source, destination and corresponding bandwidth requests.

Using the method according to the invention, a bandwidth management system—not shown—reserves a bandwidth in the individual communication paths A, B, C, D, E, in accordance with the following conditions:

first communication path A: MAX [BW (3), BW (4), BW(5), BW(6)]
second communication path B: MAX [BW (3), BW (4)]
third communication path C: MAX [BW(5), BW(6)]
fourth communication path D: BW(5)
fifth communication path E: BW(6)

Here the formula character MAX signifies the maximum arguments enclosed in square brackets. The argument BW(*) signifies a bandwidth request of the argument enclosed in brackets * which * is the number denoting the respective network element, which coincides with the reference numbers of the network elements 1, 3, 4, 5, 6. For the fourth and fifth communication paths D, E and the communication path topology given here, there is no computational rule for a maximum since in this case only a bandwidth BW(5), BW(5) has to be reserved each time for the fifth or sixth network element. Therefore MAX [BW(5)]=BW(5) or MAX [BW (6)]= BW(6) applies in this case.

In the case where specific reservation requests are rejected due to bottlenecks in the packet-oriented network or because of other reasons, the following options are provided according to the following embodiments of the invention.

A failed bandwidth reservation which was signaled by means of an acknowledgment message will be used as an opportunity to remove an associated destination network element 3, 4, 5, 6 from a destination list and not signal the incoming call to this network element.

Alternately, the incoming call at the affected destination network element 3, 4, 5, 6 is signaled by a message that is output at an output unit 13, which message gives the subscriber information about an existing bandwidth problem. Alternately or additionally, a further bandwidth reservation attempt is made on acceptance of the incoming call with a previously successful bandwidth reservation.

Receipt of an incoming call at a call pickup group, for example at the fifth terminal 5, causes all non-participating communication paths B, E to be released on the now successful "thru-connected" link to the fifth terminal 5 via the communication paths A, C, D. The bandwidth reservations allocated to the released communication paths B, E are released. Consequently, the required bandwidth is accurately reserved for the existing connection.

FIG. 2 shows a variant of communication path topology similar to that achieved in FIG. 1, in which a second network element 2 appears on the calling side and on the called side only the third and the sixth network element is included in the communication link.

Such a communication link then occurs, for example, if an attempt is made to connect an outgoing call from one of the calling network elements 1, 2 over several paths to a destination formed by the network elements 3, 6.

In this case, calling network elements 1, 2 can be allocated to subscribers which at the same time have access to a service offered by the call pickup group consisting of the network elements 3, 6.

Alternately, the first and second network elements 1, 2 can be interpreted as node elements or path points which, in an area to the left of the network elements 1, 2—not shown—are linked to other network elements or node elements—not shown.

Also, in this exemplary embodiment as shown in FIG. 2 it is important to use an identical identification number for the communication link to be established in the individual communication paths F, G, H, I, J.

In another embodiment, as shown in dotted line in FIG. 1, a bandwidth management system is disclosed that reserves bandwidth in a packet-oriented network, where a packet-oriented communication link is established between a plurality of network elements via at least one communication path. The bandwidth management system 21 comprises an allocation device 11 that allocates a unique identification number for a communication link for identification of communication paths associated with a communication link and an examination device 10 that examines a respective communication path of a communication link to determine bandwidth requests requested by network elements that have the identification number. The examination device 10 also determines a bandwidth for a respective communication path as a maximum number of bandwidth requests requested by network elements in this communication path. The bandwidth management system 21 also includes a bandwidth reserving device 12 that reserves a bandwidth in the respective communication path via the bandwidth value.

The invention claimed is:
1. A method for reserving bandwidth in a packet-oriented network in which a packet-oriented communication link is established between a plurality of network elements and comprises at least one communication path, the method comprising:

allocating a unique identification number for the communication link for identification of the at least one communication path associated with the communication link, the unique identification number being unique to call setups associated with the communication link;

initiating a plurality of bandwidth requests by at least one network element of the plurality of network elements for the at least one communication path, the plurality of bandwidth requests including the unique identification number;

determining a bandwidth value for the communication link as a maximum value of bandwidth requested in the plurality of bandwidth requests by the at least one network element of the plurality of network elements for the communication link; and attempting to reserve the bandwidth value in the at least one communication path that comprises the communication link;

releasing the reserved bandwidth value in any of the at least one communication path if that communication path is a non-participating communication path to the communication link after the communication link is established;

rejecting a bandwidth request of the plurality of bandwidth requests for the at least one communication path;

removing a destination network element associated with the rejected bandwidth request from a destination list; and not signaling an incoming call to the associated destination network element.

2. The method of claim 1, wherein the at least one communication path comprises a plurality of communication paths and the communication paths between the network elements are connected via at least one network node.

3. The method of claim 2, wherein the bandwidth request is initiated by at least one calling network element.

4. The method of claim 1, wherein the bandwidth request further comprises a statement of source, a statement of destination, and corresponding bandwidth requests.

5. The method of claim 1 further comprising reserving the bandwidth value in the at least one communication path that comprises the communication link.

6. The method of claim 5 further comprising examining the at least one communication path of the communication link to determine whether a bandwidth request of the plurality of bandwidth requests has the unique identification number.

7. The method of claim 6 further comprising confirming the reserved bandwidth value.

8. The method of claim 6 further comprising correcting the reserved bandwidth value to a higher bandwidth requirement.

9. The method of claim 1 wherein the rejecting of the bandwidth request occurs due to at least one bottleneck in the at least one communication path.

10. The method of claim 1 further comprising rejecting a bandwidth request of the plurality of bandwidth requests for the at least one communication path and outputting a message to alert a subscriber to an existing bandwidth problem associated with the rejected bandwidth request.

11. A bandwidth management system that reserves bandwidth in a packet-oriented network in which a packet-oriented communication link is established between a plurality of network elements and comprises at least one communication path, the system comprising:

an allocation device that allocates a unique identification number for the communication link for identification of the at least one communication path associated with the communication link, the unique identification number being unique to call setups associated with the communications link;

at least one network element of the plurality of network elements that initiates a plurality of bandwidth requests for the at least one communication path, the plurality of bandwidth requests including the unique identification number;

an examination device that determines a bandwidth value for the communication link as a maximum value of bandwidth requested by the at least one network element of the plurality of network elements in the plurality of bandwidth requests for the communication link; and a bandwidth reserving device that reserves the bandwidth value in the at least one communication path that comprises the communication link;

the bandwidth reserving device releasing the reserved, bandwidth value in any of the at least one communication path if that communication path is a non-participating communication path to the communication link after the communication link is established;

the bandwidth reserving device rejecting a bandwidth request of the plurality of bandwidth requests for the at least one communication path;

wherein the a destination network element associated with the rejected bandwidth request is removed from a destination list; and wherein the destination network element associated with the rejected bandwidth request is not signaled an incoming call after that at least one network element is removed from the destination list.

12. The system of claim 11, wherein the at least one communication path comprises a plurality of communication paths and the communication paths between the plurality of network elements are connected via at least one network node.

13. The system as claimed in claim 12, wherein the bandwidth request is initiated by at least one calling network element.

14. The system as claimed in claim 12, wherein the bandwidth request further includes a statement of source, a statement of destination, and corresponding bandwidth requests.

15. The system of claim 11 wherein the rejecting of the bandwidth request occurs due to at least one bottleneck in the at least one communication path.

16. The system of claim 11 wherein the bandwidth reserving device reserves the bandwidth value in the at least one communication path that comprises the communication link.

17. The system of claim 11 further comprising an examination device that examines the at least one communication path of the communication link to determine whether a bandwidth request of the plurality of bandwidth requests has the unique identification number.

18. The system of claim 17 wherein the examination device confirms the reserved bandwidth value.

19. The system of claim 17 wherein the examination device causes the reserved bandwidth value to be corrected to a higher bandwidth requirement.

20. The system of claim 11 further comprising an output unit that outputs a message to alert a subscriber to an existing bandwidth problem associated with a rejected bandwidth request.

\* \* \* \* \*